United States Patent
Sugimoto et al.

(10) Patent No.: US 10,241,730 B2
(45) Date of Patent: Mar. 26, 2019

(54) PRINTER DEVICE, METHOD, AND CONTROL DEVICE FOR PRINT TEMPLATES

(71) Applicant: Seiko Epson Corporation, Tokyo (JP)

(72) Inventors: Takuya Sugimoto, Shiojiri (JP);
Susumu Shiohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/461,386

(22) Filed: Mar. 16, 2017

(65) Prior Publication Data
US 2017/0185357 A1 Jun. 29, 2017

Related U.S. Application Data

(63) Continuation of application No. 14/193,614, filed on Feb. 28, 2014, now Pat. No. 9,639,301.

(30) Foreign Application Priority Data

Mar. 1, 2013 (JP) .................................. 2013-040271

(51) Int. Cl.
*G06F 3/12* (2006.01)
*G06K 15/00* (2006.01)
*G06K 15/02* (2006.01)

(52) U.S. Cl.
CPC .......... *G06F 3/1206* (2013.01); *G06F 3/1205* (2013.01); *G06F 3/125* (2013.01); *G06F 3/1243* (2013.01); *G06F 3/1257* (2013.01); *G06F 3/1285* (2013.01); *G06K 15/002* (2013.01); *G06K 15/1889* (2013.01); *G06K 15/1893* (2013.01); *G06K 15/4005* (2013.01)

(58) Field of Classification Search
None
See application file for complete search history.

(56) References Cited

U.S. PATENT DOCUMENTS

| 7,603,445 | B1 | 10/2009 | Fehrle | |
| 2003/0174357 | A1* | 9/2003 | Lester | H04N 1/00222 358/1.15 |
| 2004/0187079 | A1* | 9/2004 | Yamada | G06F 17/211 715/246 |
| 2006/0066905 | A1 | 3/2006 | Takashima et al. | |
| 2007/0013935 | A1* | 1/2007 | Uchida | G06F 3/1204 358/1.13 |

(Continued)

FOREIGN PATENT DOCUMENTS

| JP | 2002-014792 A | 1/2002 |
| JP | 2003-118211 A | 4/2003 |

(Continued)

*Primary Examiner* — Henok Shiferaw
(74) *Attorney, Agent, or Firm* — Nutter McClennen & Fish LLP; Alex Nagorniy

(57) ABSTRACT

Additional information can be appropriately added to an area in a template. The web application execution unit of a printer displays a print layout on a control device in a format enabling adding additional information to areas formed in the printing area of a print medium based on a first template, and when additional information is added to one area, changes to a format reflecting the additional information applied to the one area, and displays the print layout.

15 Claims, 9 Drawing Sheets

(56) References Cited

U.S. PATENT DOCUMENTS

| | | |
|---|---|---|
| 2007/0165270 A1* | 7/2007 | Kim .................. G06F 3/1205 358/1.15 |
| 2007/0171466 A1 | 7/2007 | Shigeeda |
| 2008/0189603 A1* | 8/2008 | Kikuchi ............. G06F 17/248 715/243 |
| 2008/0204809 A1* | 8/2008 | Miyashita ........... G06F 17/212 358/1.18 |
| 2008/0285082 A1 | 11/2008 | Morooka |
| 2009/0002755 A1 | 1/2009 | Isoda |
| 2009/0109480 A1* | 4/2009 | Osaka ................ G06F 17/211 358/1.15 |
| 2009/0303515 A1 | 12/2009 | Imai |
| 2011/0141493 A1 | 6/2011 | Berger et al. |
| 2011/0242585 A1 | 10/2011 | Inoue et al. |
| 2012/0233702 A1 | 9/2012 | Matsuda et al. |
| 2014/0247464 A1 | 9/2014 | Sugimoto et al. |

FOREIGN PATENT DOCUMENTS

| | | |
|---|---|---|
| JP | 2006-065677 A | 3/2006 |
| JP | 2006-181808 A | 7/2006 |
| JP | 2007-122486 A | 5/2007 |
| JP | 2008-210217 A | 9/2008 |
| JP | 2008-312154 A | 12/2008 |
| JP | 2010-238039 A | 10/2010 |
| JP | 2012-048415 A | 3/2012 |
| JP | 2012-190320 A | 10/2012 |

\* cited by examiner

FIG. 4A  TEMPLATE T1 (FIRST TEMPLATE)

| TEMPLATE NAME | TEMPLATE AREA NAME | ORIGIN | IMAGE TYPE | IMAGE DETAILS | DEFAULT INFORMATION | |
|---|---|---|---|---|---|---|
| | | | | | DEFAULT IMAGE ORIGIN | DEFAULT IMAGE INFORMATION |
| templateT1 | AREA A1 | (X1, Y1) | GRAPHIC IMAGE | – | | |
| templateT1 | AREA A2 | (X2, Y2) | TEXT IMAGE | FONT: CHARACTER SIZE: | (a1, b1) | 'FN01 Δ Text' |
| templateT1 | AREA A3 | (X3, Y3) | TEXT IMAGE | FONT: CHARACTER SIZE: | | |
| templateT1 | AREA A4 | (X4, Y4) | TEXT IMAGE | FONT: CHARACTER SIZE: | | |

FIG. 4B

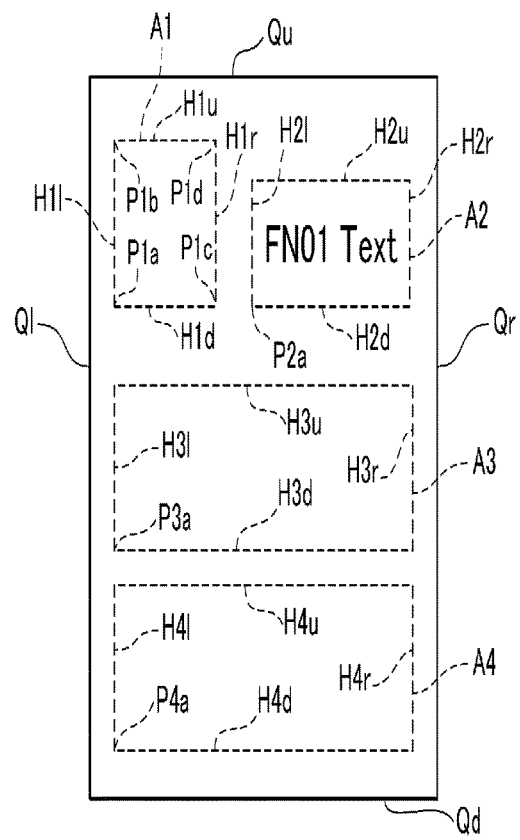

PRINTER DEVICE, METHOD, AND CONTROL DEVICE FOR PRINT TEMPLATES

This application is a continuation of U.S. application Ser. No. 14/193,614, filed on Feb. 28, 2014, which priority is claimed under 35 U.S.C. § 119 from Japanese patent application nos. JP 2013-040271 filed on Mar. 1, 2013, which is hereby incorporated by reference in its entirety.

BACKGROUND

1. Technical Field

The present disclosure relates to a printing device with a print function, a control method of the printing device, and a control device that can connect to the printing device.

2. Related Art

Systems that print by a printer using a previously prepared template are known from the literature. See, for example, JP-A-2012-048415. The template may have a single print area, but is generally divided into plural print areas.

The template anticipates information being added to particular areas in the template. This enables dynamically changing the appearance of a specific area by, for example, adding a specific color to the background or making an image a specific color based on the added information. This requires that the user is able to appropriately add the desired additional information to the desired area.

SUMMARY

At least one embodiment of the present invention enables appropriately placing additional information in areas defined by a template.

One aspect of at least one embodiment of the present invention is a printing device including; a control unit that displays a print layout in a format enabling adding additional information to a template area formed in a printing area based on a first template, and changes the print layout to a format reflecting the additional information added to the one template area and displays the changed print layout when adding additional information to one template area is specified.

When additional information is applied to a particular template area, this aspect of at least one embodiment of the present invention displays the print layout with the format changed to reflect the additional information in the one template area. As a result, adding additional information can be specified while checking the effect of adding the additional information, and appropriate additional information can be added.

In another aspect of at least one embodiment of the present invention, the first template includes information indicating the location of the origin of each template area in the printing area; and the control unit estimates the space of each template area in the printing area based on information contained in the first template, and displays the print layout in a format enabling specifying the space of each template area and adding additional information to each template area.

Thus comprised, at least one embodiment of the present invention can display a print layout LO based on a first template in a way enabling the user to appropriately add additional information to each area when the first template does not include information clearly identifying the location of each template area in the printing area but does include information indicating the location of the origin of each template area.

In another aspect of at least one embodiment of the present invention, the printing device also has a storage unit that stores the first template; the control unit storing a template corresponding to the print layout changed by adding additional information to a template area as a second template in the storage unit.

This aspect of at least one embodiment of the present invention enables printing based on a stored second template to reflect the additional information added to a template area.

A printing device according to another aspect of at least one embodiment of the present invention can connect to and communicate with a control device; and the control unit communicates with the control device and displays a print layout based on the first template on a display unit of the control device.

With this aspect of at least one embodiment of the present invention, the print layout is displayed by the control device, and additional information can be added to a template area through the control device.

In a printing device according to another aspect of at least one embodiment of the present invention, the control unit executes a web server that outputs display data related to a print layout and displays the print layout on the display unit of the control device when accessed from the control device by a web browser.

This aspect of at least one embodiment of the present invention enables adding additional information to a template area over a network using a control device. More specifically, the control device can simply have a web browser, which is particularly convenient because installing special software on the control device is not required.

Yet further preferably, the additional information is information related to the color of a template area, or is information related to the color of an image printed in a template area.

This aspect of at least one embodiment of the present invention enables adding color to a particular template area or to an image printed in a template area, and can produce dynamic printout by editing a first template.

Another aspect of at least one embodiment of the present invention is a control method of a printing device, the control method including: displaying a print layout in a format enabling adding additional information to a template area formed in a printing area based on a first template; and changing the print layout to a format reflecting the additional information added to the one template area and displaying the changed print layout when adding additional information to one template area is specified.

When additional information is applied to a particular template area, this aspect of at least one embodiment of the present invention displays the print layout with the format changed to reflect the additional information in the one template area. As a result, adding additional information can be specified while checking the effect of adding the additional information, and appropriate additional information can be added.

Another aspect of at least one embodiment of the present invention is a control device connectable to a printing device, the control device including: a control unit that displays a print layout in a format enabling adding additional information to a template area formed in a printing area based on a first template, and changes the print layout to a format reflecting the additional information added to the one template area and displays the changed print layout when adding additional information to one template area is specified.

When additional information is applied to a particular template area, this aspect of at least one embodiment of the present invention displays the print layout with the format changed to reflect the additional information in the one template area. As a result, adding additional information can be specified while checking the effect of adding the additional information, and appropriate additional information can be added.

Other objects and attainments together with a fuller understanding of some embodiments will become apparent and appreciated by referring to the following description and claims taken in conjunction with the accompanying drawings.

BRIEF DESCRIPTION OF THE DRAWINGS

FIGS. 4A and 4B show a first template and print areas based on the first template.

DESCRIPTION OF EMBODIMENTS

At least one embodiment of the present invention is described below with reference to the accompanying figures.

Figure 1:
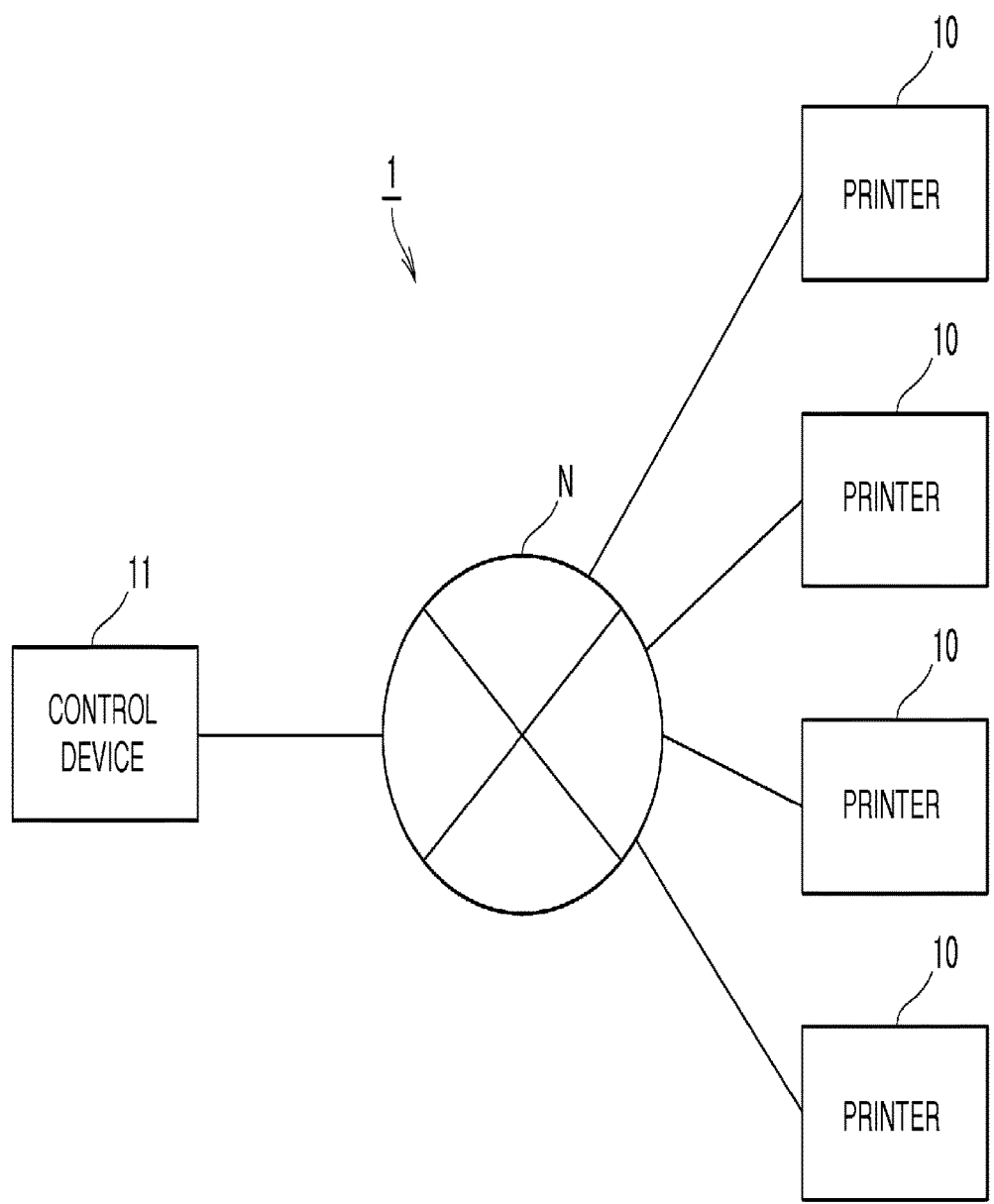
FIG. 1 is a block diagram of a control system according to a preferred embodiment of at least one embodiment of the present invention.

FIG. 1 shows a control system 1 according to at least one embodiment of the present invention.

As shown in FIG. 1, the control system 1 includes a plurality of printers 10 (printing devices). The control system 1 enables connecting a control device 11 through a network N such as a LAN or the Internet to a desired printer 10 in this group of plural printers 10.

The printers 10 have the ability to print in color on a recording medium. The printer 10 according to at least one embodiment of the present invention enables loading label paper having adhesive labels cut to a specific size affixed to a continuous liner, and can print images on the individual labels (recording media) on the liner according to a template.

The control device 11 could be any device on which a web browser (program) is installed. More particularly, a desktop computer, notebook computer, tablet computer, cell phone, or other such device can be made to function as the control device 11.

Figure 2:
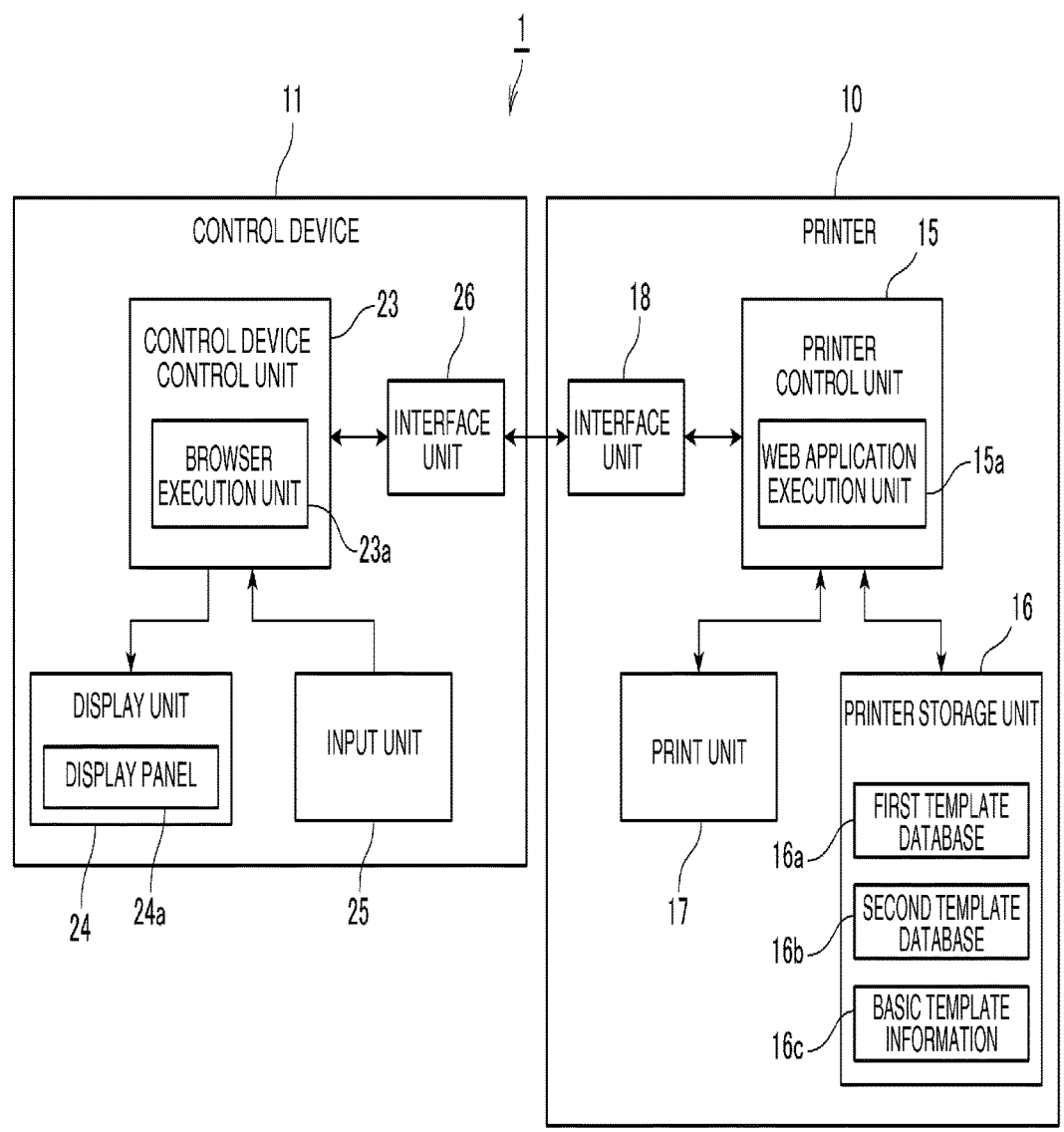
FIG. 2 is a block diagram showing the functional configuration of a control device and printer.

FIG. 2 is a block diagram showing the functional configuration of the printer 10 and the control device 11.

As shown in FIG. 2, the printer 10 includes a printer control unit 15, a printer storage unit 16, a print unit 17, and an interface unit 18.

The printer control unit 15 includes a CPU, RAM, ROM, and other peripheral circuits, and centrally controls other parts of the printer 10. A function block of the printer control unit 15 is a web application execution unit 15a, which is further described below. The printer storage unit 16 includes EEPROM or other nonvolatile memory, and nonvolatilely stores data rewritably. The data stored in the printer storage unit 16 is further described below. The print unit 17 includes a mechanism for conveying the loaded recording medium (including the label paper described above), and a printhead, and prints images on the recording medium. The interface unit 18 communicates with an external device according to a specific communication standard as controlled by the printer control unit 15.

The control device 11 includes a control device control unit 23, a display unit 24, an input unit 25, and an interface unit 26.

The control device control unit 23 includes a CPU, RAM, ROM, and other peripheral circuits, and centrally controls other parts of the control device 11. The control device control unit 23 includes a browser execution unit 23a as further described below. The display unit 24 includes a display panel 24a such as an liquid crystal display panel, and displays images on the display panel 24a as controlled by the control device control unit 23. The input unit 25 is connected to a mouse, keyboard, touch panel, operating keys, or other input device, detects input to the input device, and outputs to the control device control unit 23.

A specific web browser is installed to the control device 11. The browser execution unit 23a of the control device control unit 23 of the control device 11 is a function block rendered by a function of this web browser. More specifically, the function of the browser execution unit 23a is rendered by the cooperation of hardware and software, such as a CPU reading and running a web browser and related programs.

A web application (program) is installed to the printer 10. The web application execution unit 15a of the printer control unit 15 of the printer 10 is a function block rendered by a function of the web application. More specifically, the function of the web application execution unit 15a is rendered by the cooperation of hardware and software, such as a CPU reading and running a web application and related programs.

As described above, the printer 10 can print images based on a template on labels. This embodiment is configured so that templates can be edited, and more particularly so that additional information can be appropriately added to template areas as described below, by the cooperation of the browser execution unit 23a and the web application execution unit 15a. This is further described below.

To edit the template for one printer 10, the user starts the web browser of the control device 11 and instructs the web browser to access a specific predetermined address on the printer 10. In response to this command, the browser execution unit 23a of the control device 11 accesses the specific address.

Based on this access, the web application execution unit 15a of the printer 10 references the basic template information 16c stored in the printer storage unit 16 and acquires the required information, then generates and outputs a display file for displaying a user interface UI1 (FIG. 3) to the browser execution unit 23a.

Note that the printer 10 has a specific web server program (such as the Apache HTTP Server program) installed, and functions as a web server that generates and outputs a display file conforming to a specific protocol such as HTTP in response to a request from the control device 11 functioning as a client device.

The user interfaces UI1 to UI5 described below are displayed on the display panel 24a of the display unit 24 of the control device 11.

Figure 3:
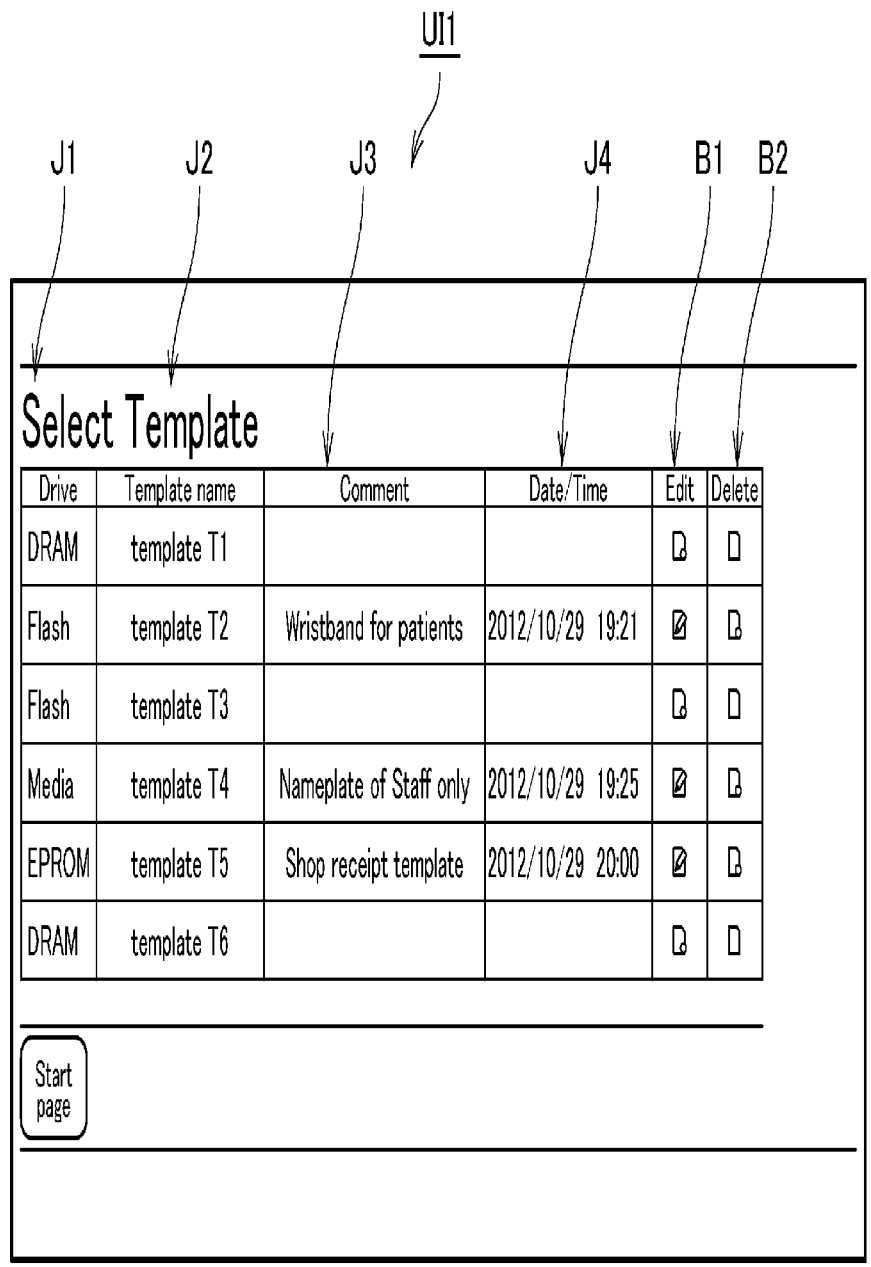
FIG. 3 shows an example of a user interface displayed by the control device.

FIG. 3 shows an example of user interface UI1.

As shown in FIG. 3, this user interface UI1 displays for each template storage location information J1 identifying where the template is stored; a template name J2 indicating the name of the template; a comment J3 added by the user about the template; and the date and time J4 the template was last edited. While described in detail, a separate user interface is also prepared for input comments J3.

As further described below, a template for which the date and time J4 field is blank is a first template stored in a first template database 16a. A template for which the date and time J4 is not blank (a template created by editing the first template) is a second template stored in a second template database 16b.

An edit button B1 that is selected to start editing a template, and a delete button B2 that is selected to delete a template, are displayed in the user interface UI1 for each template. Each button can be selected by moving a pointer with a mouse over the button and then clicking the mouse button. Because a first template, that is, a template for which the date and time J4 field is blank in the user interface UI1, cannot be deleted (for the reason further described below), the delete button B2 for a first template and the delete button B2 for a second template are displayed differently.

Note that all information that should be displayed in the user interface UI1 is contained in the basic template information 16c.

When the user selects the edit button B1 for a particular template in the user interface UI1, the browser execution unit 23a outputs data indicating the button was selected to the web application execution unit 15a using a function of a script embedded in the display file, for example. The edit button B1 for a first template (described below) was selected in this example.

When data is input from the browser execution unit 23a, the web application execution unit 15a accesses the first template database 16a, references the template data for the selected template, and generates and outputs a display file for displaying another user interface UI2 (FIGS. 5A-5C) to the browser execution unit 23a. The web application execution unit 15a accesses the first template database 16a in this example because the template selected by the user is a first template. If the template selected by the user is a second template, the web application execution unit 15a accesses the second template database 16b.

An example of a first template is described first below, and the user interface UI2 (FIGS. 5A-5C) is described next.

The printer 10 according to at least one embodiment of the present invention is a device that anticipates being used instead of a different printer (referred to below as the replaced printer).

In this example, the replaced printer was a printer that could not print in color, but was capable of monochrome printing based on a template. The first template is a template used by the replaced printer. The first template database 16a is a database that centrally stores first templates.

FIG. 4A shows an example of the content of a template T1 (template name: template T1) related to a first template. FIG. 4B shows an example of the relationship between template areas anticipated by the information contained in template T1 in FIG. 4A, and the printing area of the recording medium.

A template is information describing rules for recording images in the print area of the recording medium (a label in this example), and in this embodiment includes information defining the template areas formed in the printing area of the recording medium. The printing area is the largest area in a single recording medium (label) where images can be recorded (dots can be formed). The printing area is determined by the size of the recording medium and previously set top, bottom, left, and right margins. A template area is an area formed by segmenting the printing area in a specific way.

As shown in FIG. 4A, template T1, which is a first template, stores the template name J2, template area name J5, origin J6, image type J7, image details J8, and default information J9 for each template area.

The template area name J5 is identification information uniquely assigned to each template area.

The origin J6 contains the coordinates of the origin of the template area in a coordinate system with its origin at a specific position in the printing area. Any desired position in the printing area can be specified using coordinates in this coordinate system. The shape of a template area in this embodiment is rectangular as indicated by the dotted lines in FIG. 4B. The origin of a template area specifies a particular one of the four corners of the frame of an area. Of the four corners of each area denoted by a dotted line in FIG. 4B, the bottom left corner is the origin of the particular area. For example, corner P1a is the origin of area A1, corner P2a is the origin of area A2, corner F3a is the origin of area A3, and corner P4a is the origin of area A4.

The image type J7 is information indicating the type of image printed in each area. There are two image types in this example, text images and graphic images. A text image is an image composed of text, and more specifically is an image that is recorded using font data stored by the printer 10. A graphic image is an image that is not recorded based on font data, such as an image that is recorded based on data, such as bitmap data, denoting the color components of the individual dots forming an image.

The image details J8 is information describing the content of the image in detail when the image type is a text image. In this example, the image details J8 include information denoting the font, character size, character spacing, and line width.

The default information J9 is information related to an image that is printed in a particular area by default (a "default image" below). The default information J9 includes the default image origin J9a, and default image information J9b. The default image origin J9a contains the coordinates of the origin (reference position) of the default image in the coordinate system described above. The default image information J9b is information denoting the default image to be recorded on the label by default. For example, when a text image of the string FN01 [ ]Text (where [ ] denotes a space herein) is to be printed as the default image at a specific position in area A2 in FIG. 4B, the default information J9 related to area A2 in FIG. 4A contains information identifying the origin of the image related to the string in the default image origin J9a field, and stores information identifying the text string in the default image information J9b field. The default image could apparently be a graphic image.

All of the first templates were previously acquired from the replaced printer by a specific method, and stored in the first template database 16a of the printer 10. For example, a terminal with a dedicated tool installed is connected to the replaced printer, or a dedicated server is connected to the replaced printer through a network, and the connected dedicated tool or the dedicated server collects the first templates in the terminal or server by means of a specific function. The terminal or server then connects to the printer 10, and the first templates are stored in the first template database 16a by means of a specific function. For example, the printer 10 could have a special internal function that acquires and stores the first templates in the first template database 16a directly from the replaced printer when the printer 10 is connected to the replaced printer.

The first templates stored in the first template database 16a cannot be changed (edited). As a result, a second template created as described below can always be created by editing an original template (first template) that was used by the replaced printer.

As described above, a first template does not define template areas by, for example, specifying the coordinates of the four corners of a rectangle, and does not define template areas by specifying a combination of an origin and area size. This is due to the specifications of the replaced printer.

In the user interface UI2 described below (FIG. 5A), the print layout is displayed so that the user can see the location of each template area in the layout Based thereon, the web application execution unit 15a generates a display file for displaying the user interface UI2 after estimating the location of each template area based on the origin J6, image type J7, image details J8, and default information J9 in the first template.

The process of estimating the location of each template area based on a first template is described below with reference to FIGS. 4A and 4B.

The location of area A1 is estimated as described below.

Area A1 is a rectangle, and the position of the bottom left corner P1a in the printing area is known. The space occupied by area A1 can therefore be determined if the lengths of the left edge H1l and the bottom edge H1d are defined.

As a result, the web application execution unit 15a determines that another area is not above area A1 based on the relationship between the origins of areas other than area A1, and the origin of area A1. The web application execution unit 15a also sets the length of the left edge H1l based on the relationship to the top edge Qu of the printing area so that the top edge Qu of the printing area and the top edge H1u of area A1 are separated a specific distance. The distance between top edge Qu and top edge H1u could be previously set, or changed dynamically according to the type of image printed in the area. The web application execution unit 15a also determines the location of area A2 on the right side of area A1 based on the relationship between the origin of area A1 and the origin of area A2. The web application execution unit 15a also determines the length of bottom edge H1d so that the right edge H1r of area A1 is separated a specific distance from the left edge H2l of area A2, which is known from the origin of area A2.

The web application execution unit 15a thus defines the lengths of the left edge H1l and the bottom edge H1d of area A1, and thereby estimates the space occupied by area A1.

When a graphic image is set to be printed as the default image in area A1, the web application execution unit 15a determines the lengths of the left edge H1l and bottom edge H1d so that at least the default image is contained in the space of area A1 after determining the location where the default image is to be printed in the printing area.

The location of area A2 is estimated as described below.

As with area A1 described above, the location of the area A2 is determined by defining the lengths of the left edge H2l and bottom edge H2d of area A2.

Based on the relationship between the origins of areas other than area A2 and the origin of area A2, the web application execution unit 15a determines that another area is not located above area A2 or on the right side of area A2. The web application execution unit 15a then determines the length of left edge H2l based on the relationship to the top edge Qu of the printing area, determines the length of the bottom edge H2d based on the relationship to the right edge Qr of the printing area, and thereby estimates the location of area A2.

Note that a text image is printed as the default image in area A2 in this example. As a result, the web application execution unit 15a identifies the location for printing the default image in the printing area based on the corresponding image details J8 and default information J9, and determines the lengths of the left edge H2l and bottom edge H2d so that the default image is contained in the space of area A2.

The web application execution unit 15a also determines the spaces occupied by area A3 and area A4 by the same method.

After estimating the spaces occupied by each template area, the web application execution unit 15a generates and outputs a display file for displaying the user interface UI2 to the browser execution unit 23a.

Figure 5A:
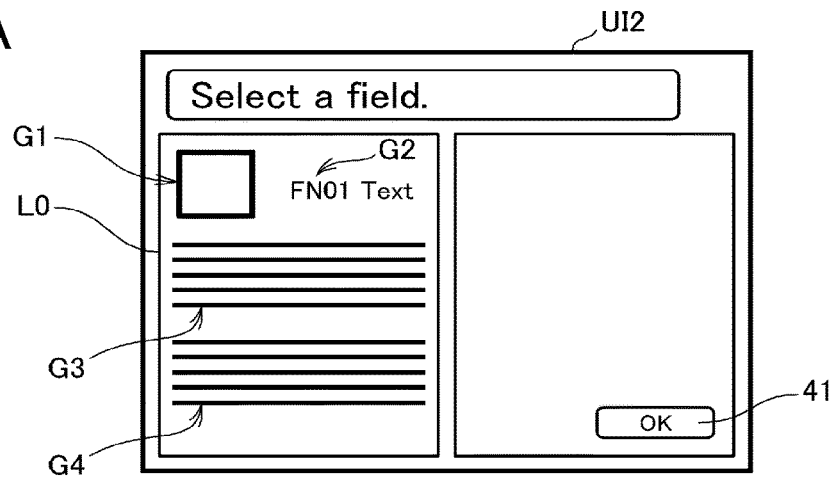
FIGS. 5A-5C show an example of a user interface displayed by the control device.

FIG. 5A shows an example of this user interface UI2.

The user interface UI2 displays a print layout LO in approximately the left half of the window. The print layout LO shown in FIG. 5A is based on template T1 (first template) in FIG. 4A. The print layout LO is a print layout based on a first template.

A specific image is displayed in each area for which a space was estimated in the print layout LO, and each template area is shown clearly.

More specifically, area A1 is an area where a graphic image is printed, and an image G1 composed of a rectangular frame is displayed in the space corresponding to area A1 in the print layout LO. The rectangular frame of this image G1 is a shape conforming to the space of area A1. That an image of a rectangular frame in the print layout LO represents a graphic image is taught to the user through a user manual, for example, and by seeing this image G1, the user can immediately know the location of the area (area A1) where image G1 is printed, and that a graphic image will be printed in that area. If the user sets the mouse pointer over the image G1, the space of area A1 corresponding to image G1 (estimated space) is indicated by a dotted line (shown in FIGS. 7A and 7B). If the user then clicks with the mouse, the user can specify the location of area A1.

Area A2 is an area where a text image is printed, and is an area where a default image containing text is printed. An image G2 corresponding to this default image is displayed in the space occupied by area A2 in the print layout LO. By seeing this image G2, the user can immediately know the location of the area (area A2) where image G2 is printed, and that a default text image will be printed in that area. If the user sets the mouse pointer over the image G2, the space of area A2 corresponding to image G2 (estimated space) is indicated by a dotted line (shown in FIG. 6). If the user then clicks with the mouse, the user can specify the location of area A2.

Area A3 is an area where a text image is printed but a default image is not printed. The image G3 displayed in the space corresponding to area A3 in the print layout LO enables the user to intuitively recognize that a text string will be printed as a text image in this space. In this example, image G3 contains plural bold horizontal lines each representing one line of text with a space therebetween. The thickness, length, and gap between the bold lines are determined by the web application execution unit 15a based on the image details J8 related to area A3 in template T1. By seeing this image G3, the user can immediately know the location of the area (area A3) where image G3 is printed, and that a text image will be printed in that area. If the user sets the mouse pointer over the image G3, the space of area A3 corresponding to image G3 (estimated space) is indicated by a dotted line. If the user then clicks with the mouse, the user can adjust the location of area A3.

Area A4 is similar to area A3, and further description thereof is thus omitted.

Additional information can also be added to each area in at least one embodiment of the present invention.

More specifically, this additional information includes the background color of the area, and the color of the text when a text image is printed in that area.

By enabling adding additional information related to color to each template area, color can be added to desired areas and desired images when recording images based on a template, and the printer 10 can take advantage of its color printing capability to dynamically produce printouts.

At least one embodiment of the present invention enables the user to appropriately set the background color and text color (to add additional information) for each template area.

An example of adding additional information to an area where a text image is printed, and an example of adding additional information to an area where a graphic image is printed, are described below.

As described above, area A2 is an area where a text image is recorded. When the user clicks on the image G2 and specifies the location of the area A2 in the print layout LO in user interface UI2, the browser execution unit 23a outputs the location data to the web application execution unit 15a. As a result, the web application execution unit 15a generates and outputs a display file for displaying another user interface UI3 to the browser execution unit 23a. The browser execution unit 23a then displays the user interface UI3 based on the input display file.

Figure 6:
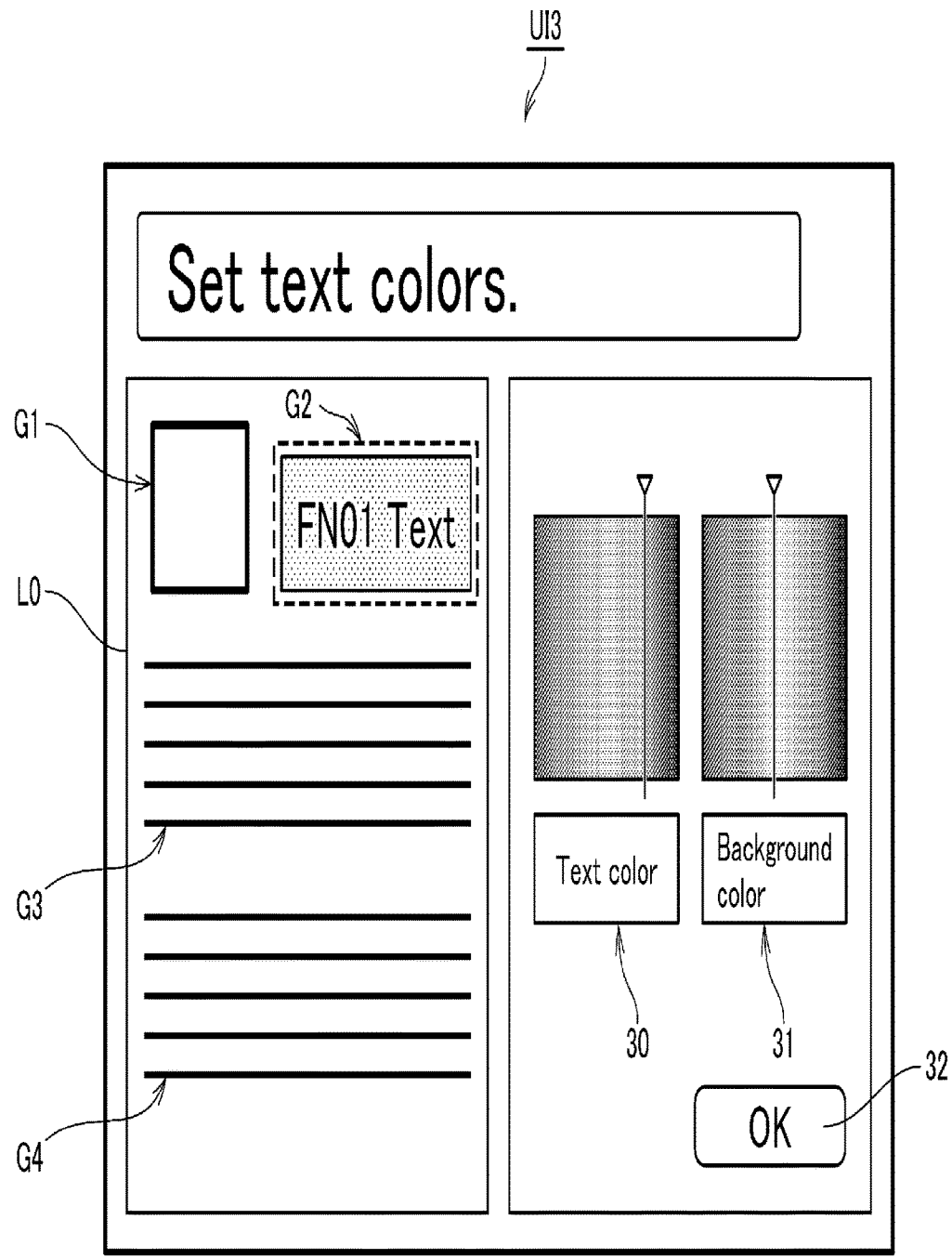
FIG. 6 shows an example of a user interface displayed by the control device.

FIG. 6 shows an example of the user interface UI3 displayed by the browser execution unit 23a.

The estimated location of the specified area (area A2 in this example) is represented by a dotted line in the print layout LO shown in the left half portion of the user interface UI3.

A user interface for setting the text color and background color of the area A2 is displayed in the right half of the window. More specifically, a box showing gradations from red at the left end to blue at the right end is displayed in the text color setting 30 for setting the text color, and the text color can be set to the desired color by the user moving the pointer to the position corresponding to the desired color. The background color setting 31 is similarly configured, and enables setting the background color to the desired color.

When the user clicks on the OK button 32 after setting the text color and the background color with the text color setting 30 and the background color setting 31, the settings are confirmed. The browser execution unit 23a then outputs the content of the settings and data confirming the setting to the web application execution unit 15a. The web application execution unit 15a generates and outputs a display file reflecting the text color and background color settings (adding additional information) to the browser execution unit 23a. The browser execution unit 23a then displays the user interface UI2 based on the input display file.

Figure 5B:
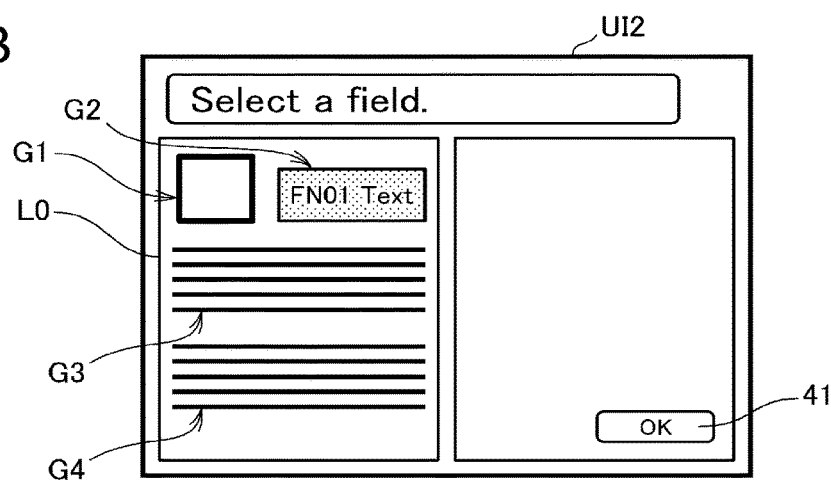

FIG. 5B shows an example of a user interface UI2 for setting the text color and background color of area A2 (adding additional information to area A2).

In the user interface UI2 shown in FIG. 5B, area A2 on the left side of the print layout LO is displayed with the background color set for that area, and the string constituting the text image printed as the default image is displayed with the set text color.

A user interface for setting the text color and background color (additional information that can be added) is thus displayed with the print layout LO in the user interface UI3 (FIG. 6) in at least one embodiment of the present invention. When the text color and background color are set, the print layout LO is then displayed in the user interface UI2 to reflect the set text color and background color.

The user can therefore quickly and appropriately see the effect of the user-defined text color and background color, and change the settings or take other action if the settings do not achieve the desired effect. More specifically, the user can appropriately add additional information to desired areas.

Note that when the text color is set for an area in which a text image is represented by bold lines in the print layout LO, as in area A3 and area A4, the bold lines are displayed using the set text color.

Adding additional information to an area where a graphic image is printed is described next.

As described above, area A1 is an area where a graphic image is recorded. By clicking on the image G1 and selecting the area A1 in the print layout LO of the user interface UI2 (FIG. 5B) after configuring the area A2, the browser execution unit 23a outputs the data to the web application execution unit 15a. In response, the web application execution unit 15a generates and outputs an image file for displaying a user interface UI4 (FIG. 7A) to the browser execution unit 23a. The browser execution unit 23a then displays the user interface UI4 based on the input display file.

Figure 7A:
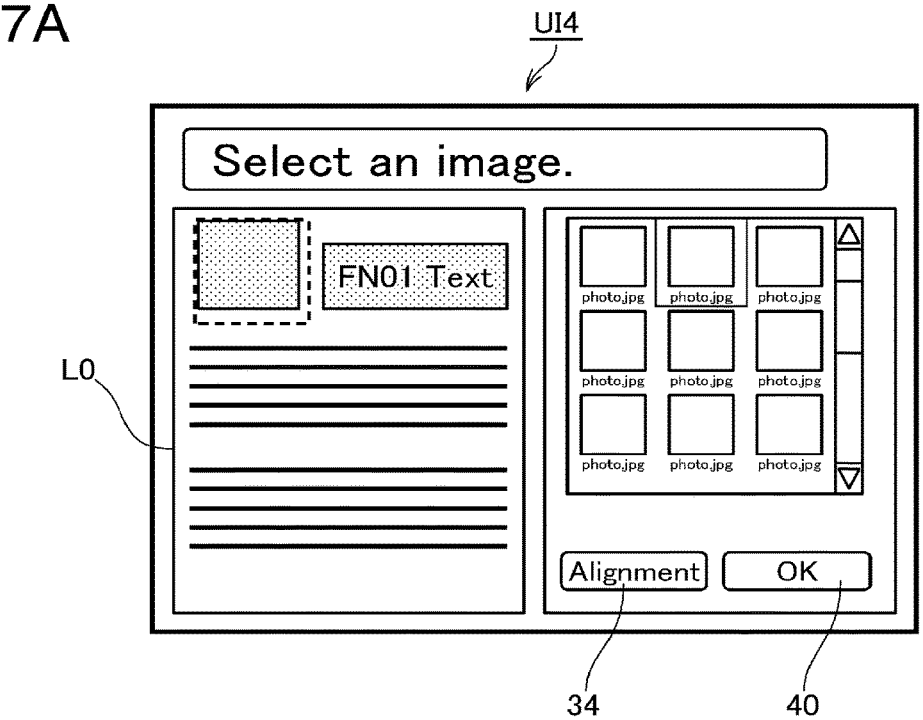
FIGS. 7A and 7B show an example of a user interface displayed by the control device.

FIG. 7A shows an example of the user interface UI4.

The location (estimated area) of the selected area (area A1 in this example) is represented by a dotted line in the print layout LO shown on the left side of the user interface UI4.

A user interface for setting the background color of area A1 is displayed on the right side of the window. More specifically, a square color icon that can be selected by clicking thereon is displayed for each color that can be set as a background color. When the user selects a color by clicking on the appropriate icon, an image with the color of the selected icon is displayed in the location of area A1. An area where a graphic image is printed and a background color has been added is referred to as a "background color area" below.

When the user has selected a color icon and then clicks on the alignment button 34, the browser execution unit 23a outputs the data to the web application execution unit 15a. The web application execution unit 15a then generates and outputs a display file for displaying a user interface UI5 (FIG. 8) to the browser execution unit 23a. The browser execution unit 23a then displays the user interface UI5 based on the input display file.

Figure 8:
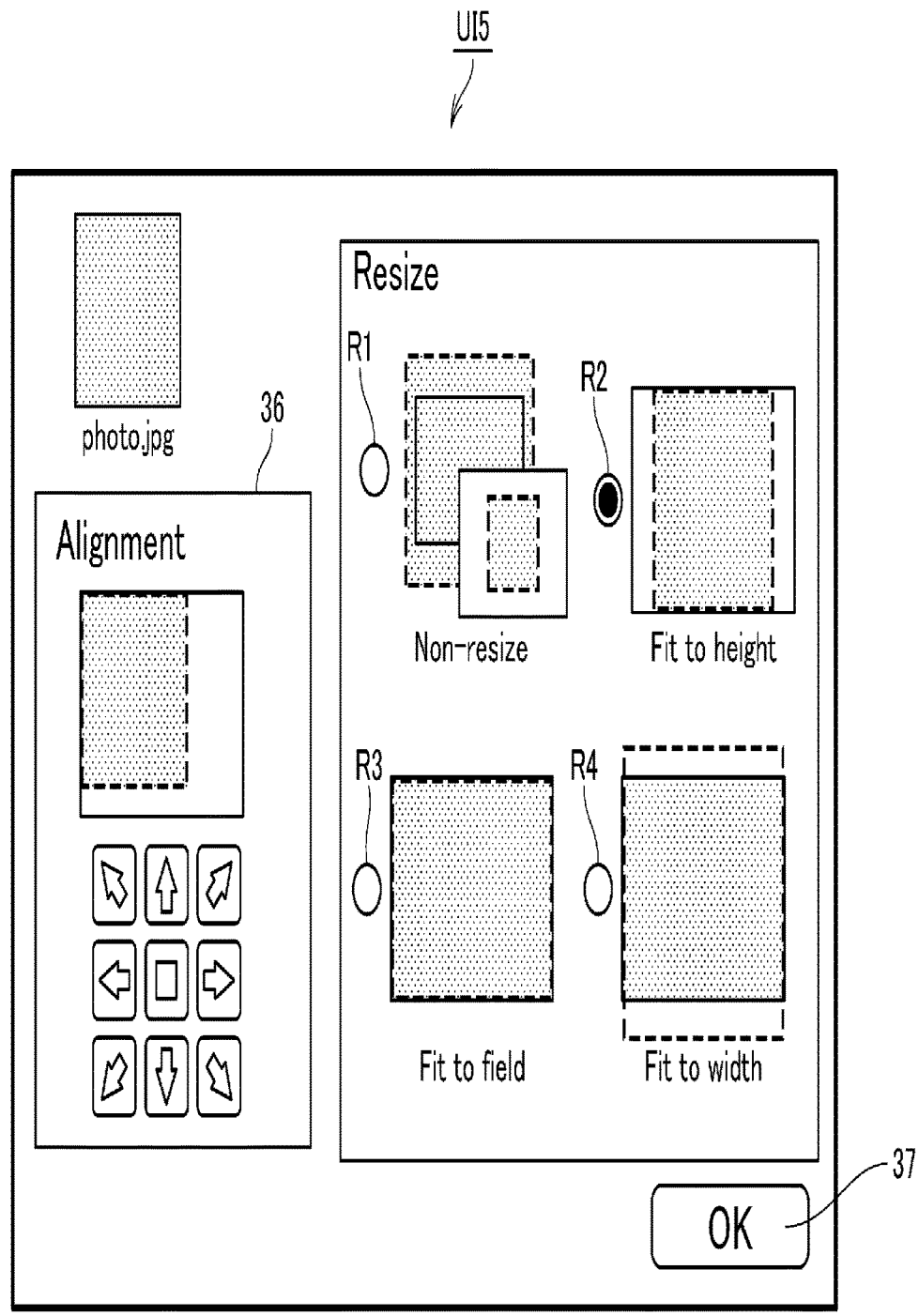
FIG. 8 shows an example of a user interface displayed by the control device.

FIG. 8 shows an example of the user interface UI5.

This user interface UI5 is a user interface for detailed setting of the shape of the background color area in the template area. Note that the background color area is rectangular.

A resizing window 35 is presented on the right side of the user interface U15. Radio buttons R1 to R4 for configuring the background color area are provided in the resizing window 35.

When radio button R1 is selected, the background color area is set to the default area.

When radio button R2 is selected, the top and bottom sides of the background color area are aligned with the top and bottom edges of the area (area A1 in this example), and the user can set the shape of the background color area by moving the left and right sides of the background color area. Moving the left and right sides is possible using the alignment window 36 displayed on the left side of the resizing window 35.

When radio button R3 is selected, the background color area is aligned with the estimated boundaries of the template area.

When radio button R4 is selected, the left and right sides of the background color area are aligned with the left and right edges of the area (area A1 in this example), and the user can set the shape of the background color area by moving the top and bottom sides of the background color area. Moving the top and bottom sides is possible using the alignment window 36.

When the shape of the background color area is set and the user clicks the OK button 37 in the user interface UI5, the browser execution unit 23a outputs the content of the settings and data confirming the setting to the web application execution unit 15a. The web application execution unit 15a then generates and outputs a display file for displaying the user interface UI4 (FIG. 7B) reflecting the settings of the background color area to the browser execution unit 23a. The browser execution unit 23a then displays the user interface UI4 based on the input display file.

Figure 7B:
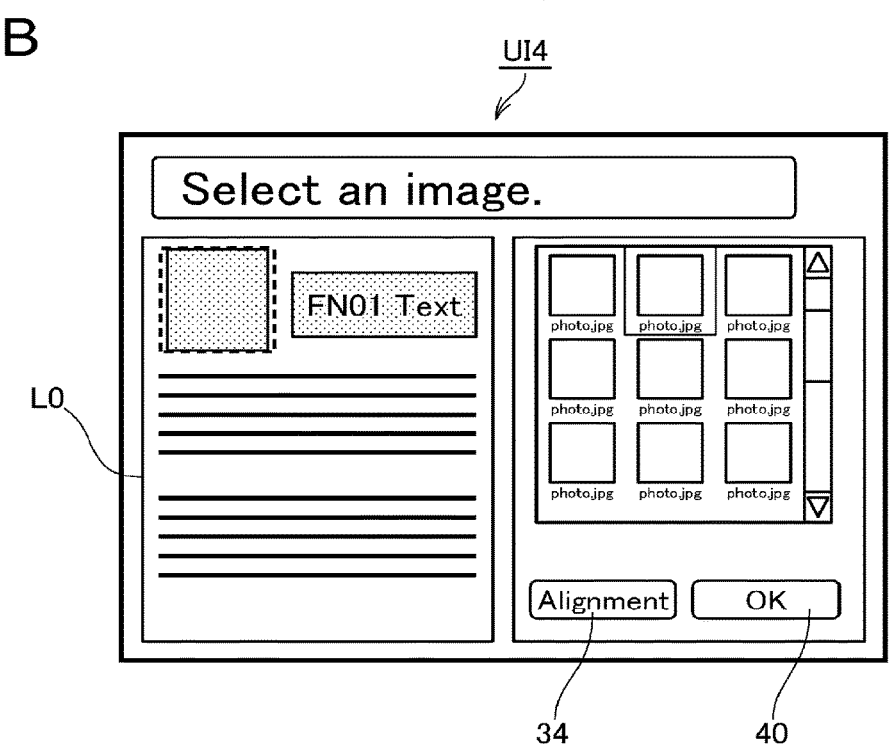

FIG. 7B shows an example of a user interface UI4 displayed after setting the background color area. As will be apparent by comparing FIG. 7A and FIG. 7B, the shape of the background color area in area A1 of the print layout LO reflects the user setting.

Using user interfaces UI4 and UI5, the user in at least one embodiment of the present invention can set the color and shape of the background color area in an area used to print a graphic image. The user can also quickly and appropriately check the color and shape of the background color area when a setting is changed.

When the OK button 40 is clicked in the user interface UI4 (FIG. 73) after finishing the settings related to the shape of the background color area, configuring the background color area is completed, and the user interface UI2 (FIG. 5C) is displayed by the cooperation of the browser execution unit 23a and the web application execution unit 15a.

Figure 5C:
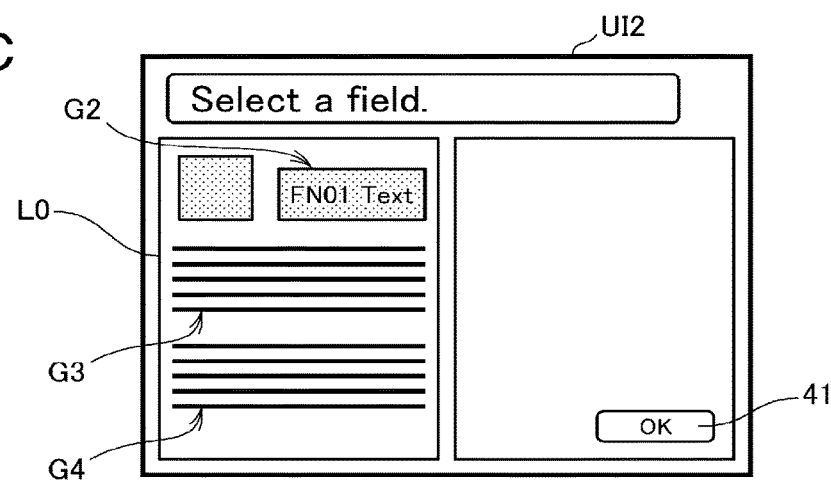

FIG. 5C shows the user interface UI2 that is displayed after the settings related to area A1 and area A2 are completed. As will be known from comparing FIG. 5A and FIG. 5C, an image with the color set for the background color area is displayed in area A1 instead of the image G1 of a rectangular frame. Note that a configuration that displays an image related to the background color area together with the image G1 is also conceivable. A default text image is displayed in the set text color in area A2 while the background is also shown with the set color.

By referring to the user interface UI2 shown in FIG. 5C, the user can quickly and appropriately see the effect of the settings made in each area (the effect of adding additional information).

When the OK button 41 is operated in the user interface UI2 in FIG. 5C, the settings made in each area by the user (the addition of additional information to each area) are confirmed. When the OK button 41 is operated, the browser execution unit 23a outputs the content of the settings for each area and data related to those settings to the web application execution unit 15a.

Based on the input data, the web application execution unit 15a generates and saves a second template in the second template database 16b.

Figure 9:
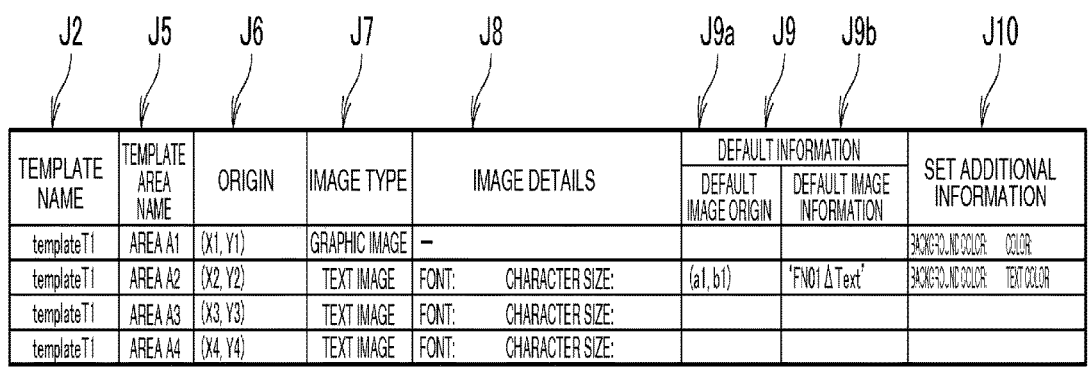
FIG. 9 shows a second template.

FIG. 9 shows an example of the second template, template T1' in this example, generated based on the first template, template T1 (FIG. 4A). The template T1' shown in FIG. 9 is a second template produced by editing template T1 as described above with reference to FIGS. 5A-5C to FIG. 8.

As will be known by comparing FIG. 4A and FIG. 9, the second template contains the set additional information J10 in addition to the same information as the first template for each area.

The set additional information J10 is information about the background color and text color set for areas where a text image is printed. For areas where a graphic image is printed, the set additional information J10 is information describing the set location of the background color area (such as the coordinates of the four corners of the background color area in the coordinate system described above), and information about the color to be added to the set background color area.

As will be known by comparing FIG. 4A and FIG. 9, the template name J2 and template area name J5 are the same in the first template and the second template. To print a label according to a specific template on the replaced printer, control commands including information specifying the template name J2 of the specific template, and information specifying the template areas and the images to be printed in each area, are output to the replaced printer.

When a control command specifying a particular template name J2 is input to the printer 10 according to at least one embodiment of the present invention, and a second template related to that template name J2 exists in the printer 10, that is, a second template with the template name J2 is stored in the second template database 16b, the printer 10 prints according to the second template. If a second template with the specified template name J2 does not exist, the printer 10 accesses the first template database 16a and prints according to the first template with that template name J2.

As also described above, the template name J2 and template area names J5 of a first template, and the template name J2 and template area names J5 of the corresponding second template, are the same. As a result, by outputting the control commands output to the replaced printer without changing the content of the commands to the printer 10, the printer 10 can be made to dynamically print the specific areas with color added to the images in those areas according to the second template. When replacing the replaced printer with the printer 10 according to at least one embodiment of the present invention, the user does not need to modify the software used with the replaced printer, and replacing a printer is much more convenient for the user.

When a second template is produced based on a first template and stored in the second template database 16b, the web application execution unit 15a appropriately rewrites the content of the basic template information 16c. The template information is therefore shown appropriately when the user interface UI1 is displayed. More specifically, the date and time J4 of the last edit is displayed for the second template, and the delete button B2 is displayed differently than for a first template.

Note that as shown in FIG. 3 the edit button B1 is also displayed differently for a first template and a second template, and the second template is displayed appropriately.

The user can also further edit the second template (add additional information to desired areas) by selecting the edit button B1 for a second template in the user interface UI1.

As described above, the web application execution unit 15a (control unit) of a printer 10 according to at least one embodiment of the present invention displays a print layout LO on the control device 11 so that additional information can be added to template areas in the printing area based on the first template, and when adding an additional information setting to one area is specified, displays the print layout LO with the one area changed to reflect the additional information.

When particular additional information is added to a particular area in at least one embodiment of the present invention, the print layout LO is displayed so that that particular area is changed to reflect the additional information. As a result, adding additional information can be controlled while being able to check the effect of adding additional information, and information can be added appropriately.

A first template in this embodiment contains information identifying the origin of each template area in the printing area of the recording medium. Based on information contained in the first template, the web application execution unit 15a of the printer 10 estimates the location of each template area in the printing area, and displays the print layout LO on the control device 11 so that the location of each area can be specified and additional information can be added to each area.

Thus comprised, at least one embodiment of the present invention can display a print layout LO based on a first template in a way enabling the user to appropriately add additional information to each area when the first template does not include information clearly identifying the location of each template area in the printing area but does include information indicating the location of the origin of each template area.

The web application execution unit 15a in this embodiment stores a template corresponding to the print layout LO after being changed to reflect adding additional information to particular areas as a second template.

This enables printing to reflect the additional information added to those areas based on a stored second template.

The web application execution unit 15a in this embodiment communicates with the control device 11 and displays a print layout LO based on a first template on the display unit 24 of the control device 11.

More specifically, the printer 10 have a web server that outputs display data related to a print layout LO in response to a request from a control device 11 functioning as a client device. When the web application execution unit 15a is accessed from the control device 11 through the web browser, the web application execution unit 15a outputs display data based on the print layout and displays the print layout LO on the display unit 24 of the control device 11.

This configuration enables the user to add additional information to areas by means of the control device 11. More specifically, the control device 11 only needs to have a web browser to edit a template T1 (generate template T1'), there is no need to install special software on the control device 11, and convenience is excellent.

The additional information in at least one embodiment of the present invention is information related to the color of a template area, or information related to the color of an image printed in a template area.

This configuration enables adding color to individual template areas or images printed in a particular template area, and producing dynamic printouts by editing a first template.

At least one embodiment of the present invention is described above with reference to a preferred embodiment thereof, but at least one embodiment of the present invention is not limited thereto and can be modified and adapted in many ways without departing from the scope of the accompanying claims.

For example, the control device 11 and printer 10 are connected through a network N in the above embodiment, but could communicate directly using the USE standard, a specific serial communication standard, or a specific parallel communication standard.

The control device 11 in at least one embodiment of the present invention accesses the printer 10 using a web browser, and displays user interfaces presenting the print layout LO based on display data input from the printer 10, but a configuration in which a dedicated software tool is installed on the control device 11, and the control device 11 communicates as needed with the printer 10 using the dedicated tool to display the user interfaces in cooperation with the printer 10 is also conceivable. A configuration in which a keyboard or other input device, and an LCD or other type of display panel, can be connected to the printer 10, and the user can use these devices to execute the processes described above, is also conceivable.

The first template database 16a and second template database 16b are stored in the printer 10 in the foregoing embodiment, but configurations in which these are stored in the control device 11 or a corresponding device are also conceivable.

The additional information is color-related information in the foregoing embodiment, but the additional information is not so limited. For example, the additional information could be information that present the template areas as framed images, or apply characteristics such as bold, italic, or underlining to a text image printed in a template area. More specifically, the additional information conceptually includes all information that can be added to a template area.

The format of the print layout LO is also apparently not limited to that described above with reference to the accompanying figures. For example, any configuration that clearly indicates the estimated location of each template area in the print layout LO presented in the user interfaces could be used.

The function blocks shown in FIG. 2 can be desirably achieved through the cooperation of hardware and software, and do not suggest a specific hardware configuration. The functions of the function blocks of the printer 10 and control device 11 could also be rendered by separate devices externally connected to the printer 10 or control device 11. The printer 10 or control device 11 could also perform the operations described above by running a program stored on an externally connected storage medium.

At least one embodiment of the present invention being thus described, it will be apparent that it may be varied in many ways. Such variations are not to be regarded as a departure from the spirit and scope of at least one embodiment of the present invention, and all such modifications as would be apparent to one skilled in the art are intended to be included within the scope of the following claims.

What is claimed is:

1. A printing device connectable to a control device, the printing device comprising:
a storage unit configured to store a first template indicating a first print layout, the first template comprising a first template name as a template name; and
a controller configured to:

receive a control command for printing including information specifying the template name, generate a first user interface for displaying the first print layout in a format enabling adding additional information to a first template area included in the first print layout, send the first user interface to the control device, receive the additional information added to the first template area after sending the first user interface, generate a second template indicating a second print layout including a second template area made based on the first template reflecting the received additional information added to the first template area, and store the second template to the storage unit with a second template name that is the same as the first template name.

2. The printing device described in claim 1, wherein:

the first template comprises a coordinate of an origin of the first template area in a printing area;

the controller is configured to estimate a space of the first template area based on the coordinate of the origin of the first template area; and the generated first user interface displays the first print layout with the estimated space of the first template area.

3. The printing device described in claim 2, wherein:

the first template area is rectangular;

the origin specifies a particular one of four corners of the first template area; and the controller estimates the space based on at least one of (1) the relationship between the origin and a top edge of the printing area and (2) the relationship between the origin and a left edge of the printing area.

4. The printing device described in claim 2, wherein:

the first print layout comprises a third template area;

the first template comprises a first coordinate of the origin of the first template area and a third coordinate of the origin of the second template area as the coordinate; and the controller estimates the space based on the relationship between the first coordinate and the third coordinate.

5. The printing device described in claim 1, wherein:

the first template comprises an image type indicating the type of an image printed in the first template area; and the first print layout displayed on the first user interface is in a format enabling adding additional information corresponding to the image type of the image printed in the first template area.

6. The printing device described in claim 5, wherein:

when the image type of the first template area is a text image, the first print layout displayed on the first user interface is in the format enabling adding a text color and a background color as the additional information.

7. The printing device described in claim 5, wherein when the image type of the first template is a graphic image, the first print layout displayed on the first user interface is in the format enabling adding a background color as the additional information.

8. A control method for generating print templates comprising:

generating a first user interface for displaying a first print layout indicated by a first template in a format enabling adding additional information to a first template area included in the first print layout, the first template comprise a first template name as a template name;

receiving a control command for printing including information specifying the template name, acquiring the additional information added to the first template area after displaying the first user interface, generating a second template indicating a second print layout including a second template area made based on the first template area reflecting the acquired additional information added to the first template area, and storing the second template to the storage unit with a second template name that is the same as the first template name.

9. The control method for generating print templates described in claim 8, further comprising:

estimating a space of the first template area based on a coordinate of an origin of the first template area in a printing area, the coordinate is included in the first template;

wherein the generated first user interface is for displaying the first print layout with the estimated space of the first template area.

10. The control method for generating print templates described in claim 9, wherein:

the first template area is rectangular;

the origin specifies a particular one of four corners of the first template area; and estimating the space is based on at least on of (1) the relationship between the origin and a top edge of the printing area and (2) the relationship between the origin and a left edge of the printing area.

11. The control method for generating print templates described in claim 9, wherein:

the first template area is rectangular;

the origin specifies a particular one of four corners of the first template area; and estimating the space is based on the relationship between the first coordinate and the third coordinate.

12. The control method for generating print templates described in claim 8, wherein:

the first template comprises an image type indicating the type of an image printed in a first template area; and the first print layout displayed based on the first display file is in the format enabling adding additional information corresponding to the image type of the image printed in the first template area.

13. The control method for generating print templates described in claim 12, wherein:

when the image type of the first template area is a text image, the first print layout displayed based on the first user interface is in the format enabling adding a text color and a background color as the additional information.

14. The control method for generating print templates described in claim 12, wherein:

when the image type of the first template is a graphic image, the first print layout displayed based on the first user interface is in the format enabling adding a background color as the additional information.

15. A printing device connectable to a control device, the printing device comprising:

a storage unit configured to store a first template indicating a first print layout; and a controller configured to:

generate a first user interface for displaying the first print layout in a format enabling adding additional information to a first template area included in the first print layout, send the first user interface to the control device, receive the additional information added to the first template area after sending the first user interface, and generate a second template indicating a second print layout including a second template area made based on the first template reflecting the received additional information added to the first template area, wherein the first template comprises an image type indicating the type of an image printed in the first template area:

when the image type of the first template area is a text image, the first print layout displayed on the first user interface is in a format enabling adding a text color and a background color as the additional information, and when the image type of the first template area is a graphic image, the first print layout displayed on the first user interface is in a format enabling adding a background color as the additional information.

\* \* \* \* \*